UNITED STATES PATENT OFFICE.

ADOLPH MARCUS DIEDRICH CLASEN, OF CHICAGO, ILLINOIS.

ELASTIC MATERIAL AND PROCESS OF PRODUCING SAME.

SPECIFICATION forming part of Letters Patent No. 710,564, dated October 7, 1902.

Application filed September 20, 1901. Serial No. 75,877. (No specimens.)

*To all whom it may concern:*

Be it known that I, ADOLPH MARCUS DIEDRICH CLASEN, of the city of Chicago, county of Cook, and State of Illinois, have invented a certain new and useful Improvement in Elastic Material and Processes of Producing the Same, of which the following is a specification.

The object of my invention is to produce an economical substitute for and improvement upon cork, which may be used with especial advantage in sealing or stoppering the mouths of bottles containing charged beverages—such as beer, pop, champagne, and the like—this new material possessing properties of durability and imperviousness to liquids and gases beyond that possessed by cork and having also the advantage of not imparting objectionable flavor to sparkling or carbonated beverages coming in contact with it, a better resistant of decay, heat, liquid-pressure, and the effects of handling than cork, while it may also be used as a packing, as a flooring, and in the manufacture of the numerous articles of merchandise now made from the natural cork. To produce this elastic material, I prefer to employ as a basal constituent of my product ground cork, which may be had by cutting up or grinding the corks which have been once used, commonly known as "old" corks, vast quantities of which are thrown away each year as valueless, or by grinding or cutting in fine pieces the waste from the cork bark, though some of the advantages of my invention may be obtained by treating the linoleum of commerce or the whole corks, as hereinafter more particularly described. Where ground cork is used, I mix it thoroughly with linseed or other vegetable oil, oxidizing the mixture by adding oxid of iron or chlorid of sulfur or other oxidizing agent until the whole mass has the desired degree of hardness or consistency, generally about the hardness of the tougher grades of leather, the degree of hardness and consistency depending somewhat on the use to which the completed product is to be put and varying accordingly. When an additional degree of consistency and cohesion is required, I stir through the mixture a fine fiber—such as cotton, flax, or wool—the composition at this stage being similar in its properties to the linoleum of commerce. I have found it convenient at this stage to stamp or mold the composition into the shapes which it is desired the finished product should attain; but this may be done at other stages of the process. The composition is next laid in a solution of water and washing-soda for about forty-eight hours and then removed and thoroughly dried in the open air for a period of from one to two days. The period of drying may be somewhat shortened by the application of artificial heat; but I consider that drying by atmospheric absorption for the period above mentioned is the better method, especially as the odor of the oil is better absorbed in the open air than in an inclosed space. The application of this solution of soda neutralizes the objectionable taste and odor of the vegetable oil which might otherwise be imparted to liquids and gases coming in contact with the composition. This solution of soda may be applied to cleanse the whole corks or the linoleum of commerce when these are used in place of the ground cork treated as above described. It is obvious that where corks or linoleum are used the application of vegetable oil and the oxidation may be dispensed with. I next put the composition (whether linoleum, cork, or the above-described preparation of ground cork) in a solution of thin varnish, consisting of shellac dissolved in alcohol, to which I add, preferably, from two to five per cent. of glycerin. The object of applying this varnish is to fill the pores of the composition, toughening and imparting to it the qualities of durability, elasticity, and imperviousness to gases and liquids, while the addition of the glycerin tends to prevent the varnish from cracking or peeling. The composition is next dried, and as a final step in my process I dip it in a boiling solution consisting of nine parts of paraffin and one part of resin. The dipping must be done as nearly instantaneously as possible, the object of this being to prevent any carbonated liquid with which the composition may come in contact from drawing taste or odor from the varnish.

The use of the varnish above described may be dispensed with altogether where the article to be made will not come in contact with carbonic gases. Its use would be unnecessary in the manufacture of packing or in a stopper for a bottle containing whisky. The application of the boiling solution of paraffin and resin may be for certain purposes dispensed with altogether and the varnish alone applied.

While I have named the agents and properties which I think desirable to use, these proportions may be varied to some extent and equivalents substituted for some of the agents specified.

Having described my invention, what I claim as new, and desire to secure Letters Patent for, is—

1. The herein-described improvement in the manufacture of elastic material, consisting in mixing ground cork with oxidized vegetable oil, saturating in a solution of soda, drying, soaking with a solution of shellac, alcohol and glycerin, drying and dipping in a bath of boiling paraffin and resin.

2. The herein-described improvement in the manufacture of elastic material, consisting in mixing ground cork with oxidized vegetable oil, saturating in a solution of soda, drying and dipping in a solution of boiling paraffin and resin.

3. The herein-described process of manufacturing elastic material, consisting in mixing ground cork with oxidized vegetable oil, saturating in a solution of soda, drying and soaking with a solution of shellac, alcohol and glycerin.

4. The herein-described improvement in the manufacture of elastic material, consisting in mixing ground cork with oxidized vegetable oil, drying and soaking with a solution of shellac, alcohol and glycerin.

5. As a new article of manufacture, the herein-described elastic material, consisting of ground cork mixed in oxidized vegetable oil, saturated in a solution of soda, dried, soaked in a solution of shellac, alcohol and glycerin, dried and dipped in a bath of boiling paraffin and resin.

6. As a new article of manufacture, the herein-described elastic material, consisting of ground cork mixed in oxidized vegetable oil, saturated in a solution of soda, dried, and dipped in a solution of boiling paraffin and resin.

7. As a new article of manufacture, the herein-described elastic material, consisting of ground cork mixed with oxidized vegetable oil, saturated in a solution of soda, dried, and soaked in a solution of shellac, alcohol and glycerin.

8. As a new article of manufacture, the herein-described elastic material, consisting of ground cork mixed with oxidized vegetable oil and dried and soaked with a solution of shellac, alcohol and glycerin.

ADOLPH MARCUS DIEDRICH CLASEN.

Witnesses:
CHARLES L. HINE,
ROBERT CATHERWOOD.